(12) United States Patent
Bauer et al.

(10) Patent No.: US 12,120,410 B2
(45) Date of Patent: Oct. 15, 2024

(54) METHOD FOR MANUFACTURING A CAMERA MODULE, CAMERA MODULE

(71) Applicant: Robert Bosch GmbH, Stuttgart (DE)

(72) Inventors: Nikolai Bauer, Moeglingen (DE); Andreas Moehrle, Stuttgart (DE); Moritz Winkler, Waldbronn (DE)

(73) Assignee: ROBERT BOSCH GMBH, Stuttgart (DE)

(*) Notice: Subject to any disclaimer, the term of this patent is extended or adjusted under 35 U.S.C. 154(b) by 171 days.

(21) Appl. No.: 17/642,506

(22) PCT Filed: Oct. 12, 2020

(86) PCT No.: PCT/EP2020/078539
§ 371 (c)(1),
(2) Date: Mar. 11, 2022

(87) PCT Pub. No.: WO2021/078551
PCT Pub. Date: Apr. 29, 2021

(65) Prior Publication Data
US 2022/0345595 A1 Oct. 27, 2022

(30) Foreign Application Priority Data
Oct. 23, 2019 (DE) ................ 10 2019 216 287.8

(51) Int. Cl.
*H04N 23/54* (2023.01)
*G02B 7/00* (2021.01)
(Continued)

(52) U.S. Cl.
CPC ............ *H04N 23/54* (2023.01); *G02B 7/003* (2013.01); *H04N 23/55* (2023.01); *H04N 23/57* (2023.01)

(58) Field of Classification Search
CPC ........ H04N 23/54; H04N 23/55; H04N 23/57; G02B 7/003; G02B 7/02; G03B 17/12; G03B 43/00
See application file for complete search history.

(56) References Cited

U.S. PATENT DOCUMENTS 6,762,492 B2 7/2004 Nakajima et al.
2008/0239525 A1 10/2008 Chan
(Continued)

FOREIGN PATENT DOCUMENTS

CN 104570266 A 4/2015
CN 106464792 A 2/2017
(Continued)

OTHER PUBLICATIONS

International Search Report for PCT/EP2020/078539, Issued Dec. 10, 2020.

*Primary Examiner* — Gevell V Selby
(74) *Attorney, Agent, or Firm* — NORTON ROSE FULBRIGHT US LLP; Gerard A. Messina

(57) ABSTRACT

A method for manufacturing a camera module. An objective is aligned in relation to an image sensor and is subsequently fixated in terms of position by connecting to a support receiving the image sensor or to a housing surrounding the image sensor. The objective is connected to the support or to the housing via at least two cylindrical pins, the cylindrical pins being in each case placed laterally against the objective and being welded on the one hand to the objective, and on the other hand to the support or the housing. A camera module is also described.

16 Claims, 4 Drawing Sheets

(51) Int. Cl.
*H04N 23/55* (2023.01)
*H04N 23/57* (2023.01)

(56) References Cited

U.S. PATENT DOCUMENTS

| | | | | |
|---|---|---|---|---|
| 2009/0103193 | A1* | 4/2009 | Berube | G02B 7/025 |
| | | | | 359/819 |
| 2017/0246704 | A1* | 8/2017 | Batista | B23K 11/002 |
| 2019/0005278 | A1 | 1/2019 | Sun et al. | |
| 2019/0145495 | A1* | 5/2019 | Hattori | F16G 1/22 |
| | | | | 474/8 |
| 2021/0025294 | A1* | 1/2021 | Brand | B23K 26/28 |
| 2021/0029280 | A1* | 1/2021 | Kim | G03B 17/12 |

FOREIGN PATENT DOCUMENTS

| | | |
|---|---|---|
| CN | 107203025 A | 9/2017 |
| DE | 112010005629 T5 | 3/2013 |
| DE | 102015225794 A1 | 6/2017 |
| WO | 2017198395 A1 | 11/2017 |
| WO | 2019199079 A1 | 10/2019 |

\* cited by examiner

METHOD FOR MANUFACTURING A CAMERA MODULE, CAMERA MODULE

The present invention relates to a method for manufacturing a camera module. Furthermore, the present invention relates to a camera module. The camera module has preferably been manufactured according to an method of the present invention.

BACKGROUND INFORMATION

Camera modules of the type mentioned above are utilized in a multiplicity of different applications. For example, they can be used for ambient monitoring in stationary or mobile safety systems, for example in video-based driver assistance systems of vehicles. Furthermore, such camera modules can be deployed in the most varied consumer products, for example in mobile terminals, such as for example smartphones or tablets. Here the trend is toward small-volume modules that are structured as simple as possible.

Main components of a camera module of the type mentioned at the outset are an image sensor and an objective having at least one lens. Generally, the image sensor is arranged on a support and surrounded by a housing for protection against outside impact. Before the objective can be connected to the support or the housing, it has to be aligned actively relative to the image sensor. For the subsequent connection of the objective to the support or the housing, as a rule adhesive or welding methods are used since by means of this at the same time the required tightness can be accomplished. However, adhesive connections exhibit a plurality of disadvantages. Among these is that the material properties of the conventional adhesives are changed as a result of humidity expansion and/or aging so that—as a function of environmental conditions—a focal position of the objective that is stable over the life cycle can hardly be achieved. There is the additional disadvantage of the usually high thermal coefficient of expansion of adhesives. A welded joint is therefore to be preferred to an adhesive connection.

U.S. Patent Application Publication No. US 2019/005278 A2 reveals for example a camera module having an objective, a lens holder, an image sensor, and a printed circuit board. During the course of the assembly of the camera module, the objective and the lens holder are aligned relative to each other and then permanently fixated by means of weld points. The weld points are made using a laser. It is further provided that a sealing element be arranged between the objective and the lens holder.

The manufacture of a welded joint presupposes no or only small clearances between the joining partners. However, small clearances cannot always be achieved in the case of a multi-axis alignment of the objective relative to the image sensor.

An object of the present invention is to enable a multi-axis alignment of the objective of a camera module in relation to an image sensor and a robust connection of the objective to a support of the image sensor or a housing receiving the image sensor, so that a focal position of the objective that is stable over the life cycle is ensured.

In order to achieve the object, the method having the features the present invention and the camera module having the features of the present invention, are provided. Advantageous specific embodiments of the present invention are disclosed herein.

SUMMARY

In the method for manufacturing a camera module in accordance with an example embodiment of the present invention, an objective is aligned in relation to an image sensor and is subsequently fixated in terms of position by connecting to a support receiving the image sensor or to a housing surrounding the image sensor. According to the present invention, the objective is connected indirectly to the support or to the housing via at least two cylindrical pins. Here the cylindrical pins are in each case placed laterally against the objective and are welded on the one hand to the objective, and on the other hand to the support or to the housing.

Using the laterally abutting cylindrical pins, it is possible to bridge even large gaps between the objective and the support or between the objective and the housing. In this way, a welded joint can be achieved between the objective and the support or between the objective and the housing regardless of the respective clearance. The objective can be aligned in a multi-axis fashion—without regard to the remaining clearance. Furthermore, compared to an adhesive connection, a permanently robust connection is achieved by means of the welded joint, so that a focal position of the objective that is stable over the life cycle is ensured.

To the extent that a camera module is mentioned above, this term also comprises an imager module having a lens holder. The lens holder is in this case the housing to which the objective is to be connected. The housing is therefore also understood to be a lens holder.

The support on which the image sensor is arranged is preferably fixedly connected, for example screwed, glued, soldered or welded, to the housing or to the lens holder. The support can in particular be a circuit board.

The respective joining partners (objective/support or objective/housing) and the cylindrical pins are preferably made from the same material. This ensures that they can be welded to each other. The material can in particular be a metallic material, for example aluminum. If a metallic material is used, pieces of round wire can be used as cylindrical pins.

In accordance with an example embodiment of the present invention, the cylindrical pins are preferably in each case placed longitudinally on a flat contact surface of the support or of the housing and welded at least in a punctiform manner to the support or to the housing in the area of a substantially linear contact area. The cylindrical pins are therefore aligned in parallel to the respective contact surface of the support or of the housing. This results in the linear contact area across the length of a cylindrical pin to the contact surface. The flat contact surface can for example be the surface of the support or of the housing that faces the objective. The contact surface can further be formed on a collar or projection of the housing. The collar can for example surround an opening into which the objective engages forming a radial gap. The welded joint can be produced in punctiform fashion or at least in sections along the linear contact area. It can further extend across the entire linear contact area. The requisite weld seam can be arranged between the cylindrical pins and the respective contact surface.

As an alternative, the weld seam can be arranged in a gusset area extending parallel to the linear contact area between the cylindrical pins and the respective contact surface. A weld joint in the area of the end faces of the cylindrical pins is also possible.

The cylindrical pins are furthermore preferably in each case placed longitudinally on a flat contact surface, for example on a flattened portion on the side of the outer circumference, of the objective and welded at least in punctiform fashion to the objective in the area of a substantially linear contact area. The cylindrical pins are therefore likewise aligned in parallel to the respective contact surface of the objective. Here as well this results in a linear contact area. Since conventionally the objective is of a cylindrical shape, a flat contact surface can be created by a flattened portion on the side of the outer circumference. Here the number of flattened portions preferably corresponds to the number of cylindrical pins. The flattened portions are furthermore preferably arranged at the same angular spacing to one another so that the cylindrical pins can also be arranged uniformly distributed across the outer circumference of the objective. The objective can then be fixated on the support or on the housing at regular intervals. In terms of the specific design and arrangement of the weld joint of the cylindrical pins to the objective, what has been said in the previous paragraph correspondingly applies and is hereby referenced.

Advantageously, during the welding process, the cylindrical pins are respectively pressed in the direction of the contact surfaces with the aid of a holding force applied from the outside. This ensures the contact of the cylindrical pins with the objective so that the linear contact area is formed. In the case of two cylindrical pins, these are preferably arranged on diametrically opposite sides of the objective with the result that the holding force applied on the holding (cylindrical) pins is mutually canceled. In the case of more than two cylindrical pins, these are preferably arranged at a uniform angular spacing relative to one another so that in this case the holding forces applied in each case from outside also cancel each other mutually. This ensures that the objective is not moved from its focal position by the holding force.

There is further preferred a sealing element, preferably a sealing ring, arranged between the objective and the support or between the objective and the housing. The sealing element prevents the ingress of humidity and/or dirt particles and thus protects the image sensor received in the housing.

The camera module furthermore provided for achieving the object mentioned at the outset comprises an objective and an image sensor that is arranged on a support and surrounded by a housing. According to the present invention, the objective is connected indirectly to the support or to the housing via at least two cylindrical pins, each cylindrical pin being welded on the one hand to the objective, on the other hand to the support or to the housing.

Even large gaps between the objective and the respective joining partner can be bridged by means of the cylindrical pins so that a welded joint between the joining partners can be produced regardless of the respective clearance. The welded joint has the advantage that it is particularly robust in comparison to an adhesive joint. It does not swell under the influence of humidity and also does not change its material properties over the life cycle on account of aging. Once set, a focal position of the objective is then maintained over the life cycle of the camera module.

The cylindrical pins preferably in each case lie on a flat contact surface of the support or of the housing and are welded to the support or to the housing at least in punctiform fashion in the area of an essentially linear contact area. The linear contact area is particularly well-suited for forming the welded joint since there is no gap in this area or the clearance is minimal.

The cylindrical pins furthermore rest preferably on a flat contact surface, for example on a flattened portion on the side of the outer circumference, of the objective and are welded at least in punctiform fashion to the objective in the area of an essentially linear contact area. Here, too, the linear contact area between the cylindrical pins and the objective is suitable for forming the welded joint, since the clearance—if a gap is present at all—is minimal.

In accordance with an example embodiment of the present invention, it is furthermore provided to arrange a sealing element, preferably a sealing ring, between the objective and the support or between the objective and the housing. The sealing element protects the image sensor received in the housing against being soiled.

In accordance with an example embodiment of the present invention, the camera module has preferably been manufactured according to the above-described method of the present invention since this enables a simple and thus cost-effective manufacture of the camera module.

A preferred specific embodiment of the present invention is described below in more detail with reference to the figures.

DETAILED DESCRIPTION OF EXAMPLE EMBODIMENTS

Figure 4:
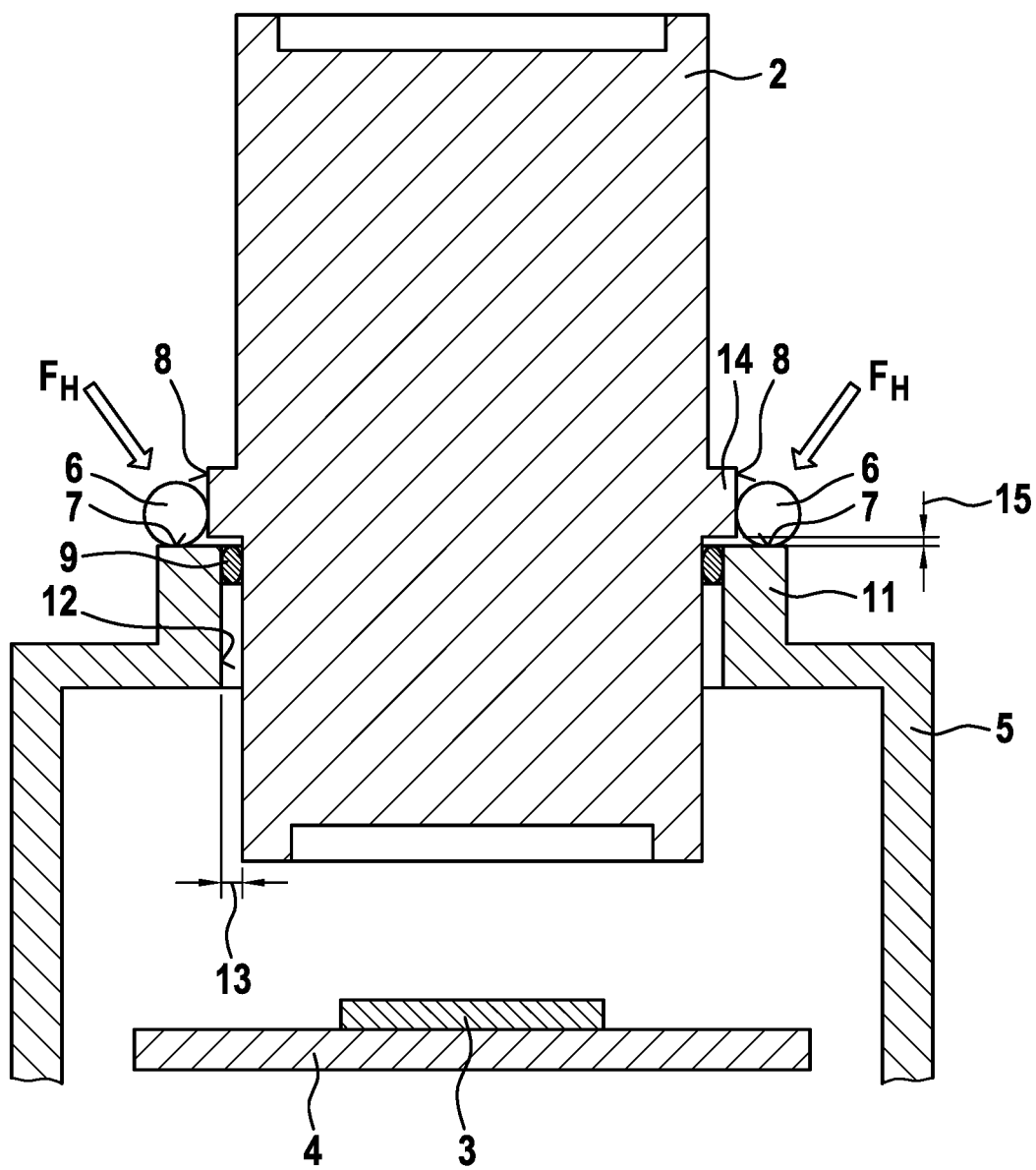
FIG. 4 shows a schematic longitudinal section through the camera module of FIG. 1.

The camera module 1 shown in FIGS. 1 to 5 comprises an objective 2 and a housing 5, an image sensor 3 being received in the housing 5 (see FIG. 4). The image sensor 3 is arranged on a support 4, for example on a circuit board. The support 4 is fastened to the housing 5 (not shown in FIG. 4), so that the position of the image sensor 3 in relation to the housing 5 is defined.

As can be furthermore gathered from FIG. 4, in the area of the image sensor 3, housing 5 has an opening 12 into which an end section of objective 2 engages, forming a radial gap 13. In the radial gap 13, an elastically deformable sealing element 9 is inserted with a radial prestress so that the housing 5 is sealed toward the outside and protected against the ingress of dirt particles. Between a circumferential flange 14 of the objective 2 and the housing 5, an axial gap 15 is furthermore formed, so that the objective 2 has no direct contact to the housing 5. This creates degrees of freedom that enable a multi-axis alignment of the objective 2 in relation to the image sensor 3. So that the objective 2 can be held in a stable focal position after the alignment, the objective 2 is then fixated in terms of position in relation to the housing 5. The positional fixation is effected indirectly via cylindrical pins 6 that bridge the axial gap 15 and on the one hand are welded to the objective 2, on the other hand to the housing 5.

Figure 1:
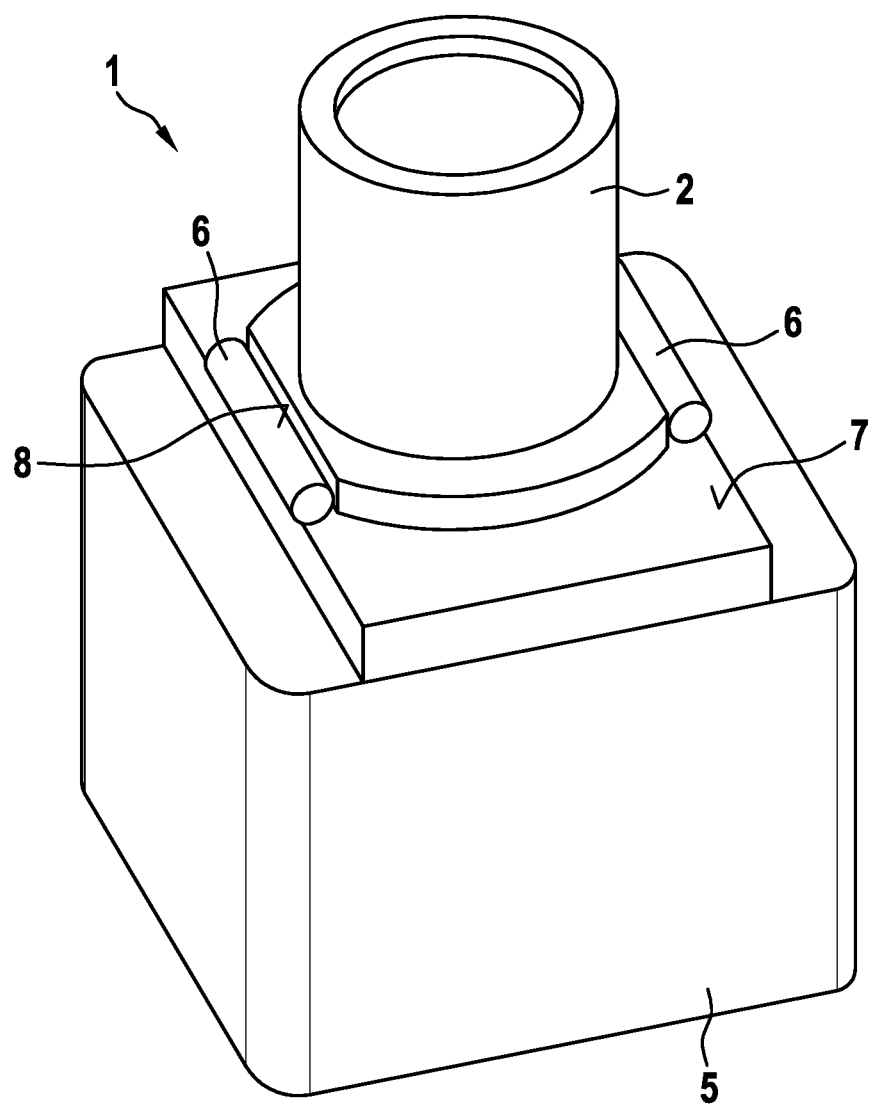
FIG. 1 shows a perspective representation of a first example camera module prior to the final positional fixation of the objective, in accordance with the present invention.
Figure 2:
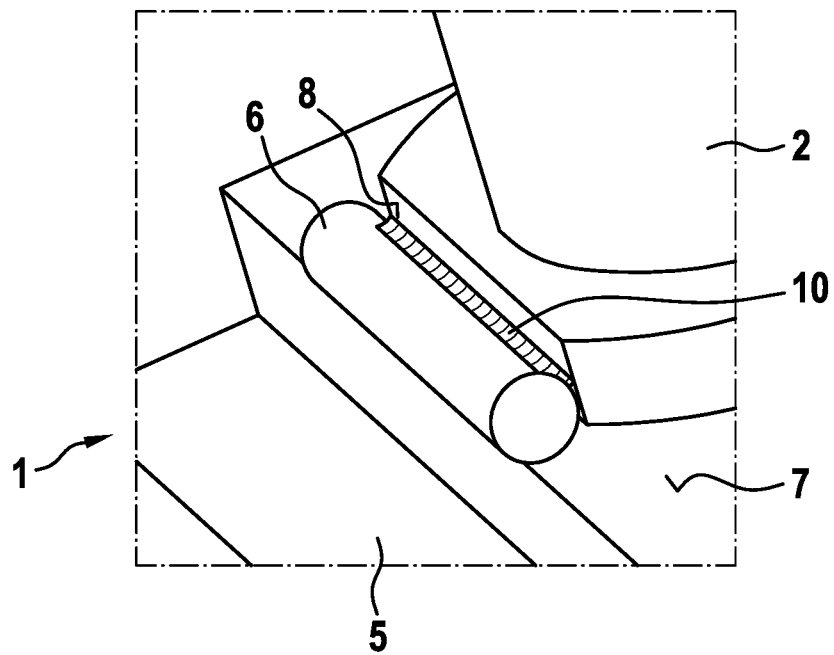
FIG. 2 shows a perspective representation of the camera module of FIG. 1 in the connection area of the objective to the housing.
Figure 3:
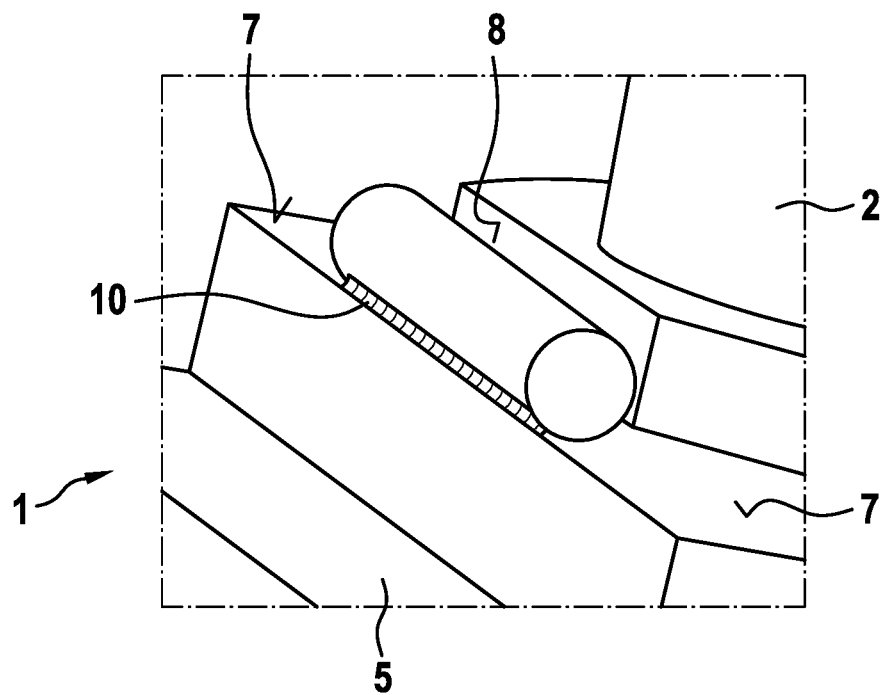
FIG. 3 shows a further perspective representation of the camera module of FIG. 1 in the connection area of the objective to the housing.

It can be gathered from FIG. 1 that the objective 2 exhibits flattened portions on the side of the outer circumference in the area of its flange 14 for contacting the cylindrical pins 6. The flattened portions form flat contact surfaces 8 by means of which a linear contact to the abutting cylindrical pins can be produced. A weld seam 10 can be positioned in this area (see FIG. 2). A corresponding weld seam 10 can be arranged in the area of a likewise linear contact area between the cylindrical pins 6 and a flat contact surface 7 of the housing 5 (see FIG. 3). The contact surface 7 is formed on a projection 11 of the housing 5 that also forms the opening 12.

Figure 5:
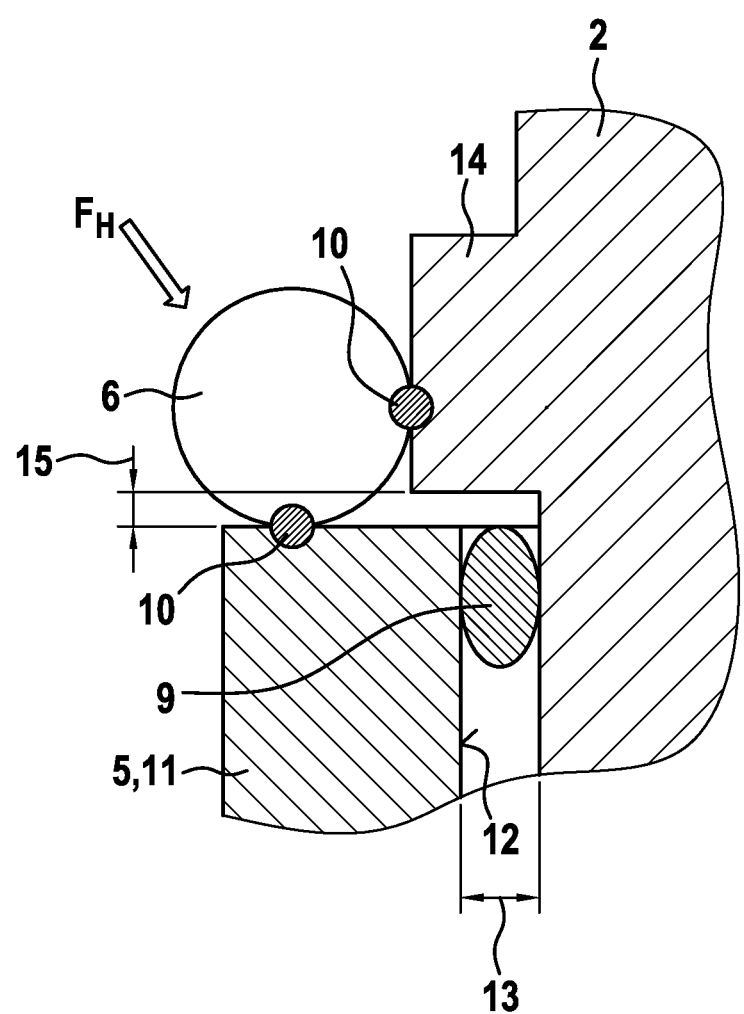
FIG. 5 shows an enlarged detail of the longitudinal section of FIG. 4 in the connection area of the objective to the housing.

When the weld seams 10 are placed, the cylindrical pins 6 are pressed in the direction of the contact surfaces 7, 8 with the aid of a holding force $F_H$ applied from the outside (see FIGS. 4 and 5). The direction of the force approximately corresponds to the angle bisector of the angle enclosed by the contact surfaces 7, 8. Since the holding force $F_H$ is applied on both cylindrical pins 6, the objective 2 is not moved from its focal position.

As shown in an exemplary fashion in FIG. 5, the weld seams 10 can also be placed directly in the in each case linear contact area of the cylindrical pins 6 with the objective 2 and the housing 5.

What is claimed is:

1. A method for manufacturing a camera module, the method comprising:
   aligning an objective in relation to an image sensor; and
   fixing, after the aligning, the objective in terms of position by connecting the objective to a support receiving the image sensor or to a housing surrounding the image sensor;
   wherein the objective is connected indirectly to the support or to the housing via at least two cylindrical pins, each of the cylindrical pins being placed laterally against the objective and being welded to the objective and to the support or the housing,
   wherein an axial gap is formed between a circumferential flange of the objective and the housing, so that the objective does not directly contact the housing to provide degrees of freedom enabling a multi-axis alignment of the objective in relation to the image sensor,
   wherein the housing includes a projection, which is a support, having a flat contact surface,
   wherein the fixing is effected indirectly via the cylindrical pins that bridge the axial gap, each of the pins directly contacting a flat contact surface of the circumferential flange of the objective and the flat contact surface of the projection, the flat contact surface of the circumferential flange of the objective being perpendicular to the flat contact surface of the projection,
   wherein when weld seams are placed, the cylindrical pins are pressed in a direction of the flat contact surfaces with the aid of a holding force applied from the outside, and
   wherein a direction of the force approximately corresponds to an angle bisector of the angle enclosed by the flat contact surfaces.

2. The method as recited in claim 1, wherein the cylindrical pins are respectively placed longitudinally on the flat contact surface of the support of the housing and are welded at least in a punctiform manner in an area of a linear contact area to the support or to the housing.

3. The method as recited in claim 1, wherein the cylindrical pins are placed in each case on the flat contact surface of the circumferential flange of the objective and welded to the objective at least a punctiform manner in an area of a linear contact area.

4. The method as recited in claim 3, wherein the flat contact surface of the objective is a flattened portion on a side of the outer circumference.

5. The method as recited in claim 1, wherein the cylindrical pins are pressed in a direction of the flat contact surface of the objective and the flat contact surface of the support of the housing during welding in each case with the aid of a holding force applied from outside.

6. The method as recited in claim 1, wherein a sealing element is arranged between the objective and the support or between the objective and the housing.

7. The method as recited in claim 6, wherein the sealing element is a sealing ring.

8. The method as recited in claim 1, wherein the objective is not moved from a focal position because the holding force is applied on both of the cylindrical pins.

9. The method as recited in claim 1, wherein the cylindrical pins are fixed so as to maintain the axial gap.

10. A camera module, comprising:
    an objective; and
    an image sensor arranged on a support and surrounded by a housing;
    wherein the objective is connected indirectly, to the support or to the housing, via at least two cylindrical pins, each of the cylindrical pins being welded to the objective and to the support or to the housing,
    wherein an axial gap is formed between a circumferential flange of the objective and the housing, so that the objective does not directly contact the housing, so as to provide degrees of freedom enabling a multi-axis alignment of the objective in relation to the image sensor,
    wherein the housing includes a projection, which is a support, having a flat contact surface,
    wherein the fixing is effected indirectly via the cylindrical pins that bridge the axial gap, each of the pins directly contacting a flat contact surface of the circumferential flange of the objective and the flat contact surface of the projection, the flat contact surface of the circumferential flange of the objective being perpendicular to the flat contact surface of the projection,
    wherein when weld seams are placed, the cylindrical pins are pressed in a direction of the flat contact surfaces with the aid of a holding force applied from the outside, and
    wherein a direction of the force approximately corresponds to an angle bisector of the angle enclosed by the flat contact surfaces.

11. The camera module as recited in claim 10, wherein each of the cylindrical pins in rests on the flat contact surface of the support or of the housing and are welded to the support or to the housing at least in a punctiform manner in an area of a linear contact area.

12. The camera module as recited in claim 10, wherein each of the cylindrical pins rest in each case on the flat contact surface of the objective and welded to the objective at least in a punctiform manner in an area of a linear contact area.

13. The camera module as recited in claim 12, wherein the flat contact surface of the circumferential flange of the objective is a flattened portion on a side of an outer circumference of the objective.

14. The camera module as recited in claim 10, wherein a sealing element is arranged between the objective and the support, or between the objective and the housing.

15. The camera module as recited in claim 14, wherein the sealing element is a sealing ring.

16. The camera module as recited in claim 10, wherein the camera module is made by performing the following:
    aligning the objective in relation to the image sensor; and fixing, after the aligning, the objective in terms of position by connecting the objective to the support receiving the image sensor or to the housing surrounding the image sensor;

wherein the objective is connected indirectly to the support or to the housing via the at least two cylindrical pins, each of the cylindrical pins being placed laterally against the objective and being welded to the objective and to the support or the housing.

* * * * *